United States Patent
Veldhuisen et al.

(10) Patent No.: US 12,209,460 B2
(45) Date of Patent: Jan. 28, 2025

(54) WEEP-HOLE DRILLING

(71) Applicant: Concore BV, Helmond (NL)

(72) Inventors: C. G. van Veldhuisen, Geboortedatum (NL); Sven Vallgren, Helmond (NL)

(73) Assignee: Concore BV, Helmond (NL)

( * ) Notice: Subject to any disclaimer, the term of this patent is extended or adjusted under 35 U.S.C. 154(b) by 0 days.

(21) Appl. No.: 18/519,763

(22) Filed: Nov. 27, 2023

(65) Prior Publication Data

US 2024/0209693 A1 Jun. 27, 2024

Related U.S. Application Data

(63) Continuation of application No. 18/165,055, filed on Feb. 6, 2023, now Pat. No. 11,828,110, which is a continuation of application No. 17/245,702, filed on Apr. 30, 2021, now Pat. No. 11,572,741.

(60) Provisional application No. 63/018,085, filed on Apr. 30, 2020.

(51) Int. Cl.
*E21B 11/00* (2006.01)
*B23B 51/04* (2006.01)
*B28D 1/14* (2006.01)

(52) U.S. Cl.
CPC ............ *E21B 11/005* (2013.01); *B23B 51/04* (2013.01); *B28D 1/146* (2013.01); *B23B 2226/75* (2013.01)

(58) Field of Classification Search
CPC .. E21B 11/005; B23B 2226/75; B23Q 11/005
See application file for complete search history.

(56) References Cited

U.S. PATENT DOCUMENTS

| | | | |
|---|---|---|---|
| 4,515,230 A | 5/1985 | Means et al. | |
| 4,852,672 A | 8/1989 | Behrens | |
| 4,869,032 A | 9/1989 | Geske | |
| 5,382,121 A | 1/1995 | Bicknell | |
| 11,828,110 B2* | 11/2023 | Veldhuisen | B28D 1/146 |
| 2003/0111266 A1 | 6/2003 | Roach | |
| 2005/0173140 A1 | 8/2005 | Oda et al. | |
| 2012/0102851 A1 | 3/2012 | Scarfo | |
| 2020/0123857 A1 | 4/2020 | Bohn et al. | |

FOREIGN PATENT DOCUMENTS

GB 2120156 11/1983

OTHER PUBLICATIONS

International Search Report and Written Opinion (PCT/US21/30166); Aug. 20, 2021; 11 pgs.

(Continued)

*Primary Examiner* — Shane Bomar
(74) *Attorney, Agent, or Firm* — Dunlap Codding, P.C.

(57) ABSTRACT

A method for creating a weep hole is disclosed. The weep hole is drilled in an uncured, concrete, hollow core structural component having one or more external surfaces and one or more internal surfaces. The weep hole is drilled using a drilling apparatus comprising a drill, a rotating drill bit with an internal fluid passageway, a power source, and a pressurized fluid source. Loose, uncured concrete material deposited near the weep hole on the one or more internal surface as a result of drilling the weep hole is removed by releasing pressurized fluid which flows from the pressurized fluid source, through the drill and the rotating drill bit.

20 Claims, 5 Drawing Sheets

(56) References Cited

OTHER PUBLICATIONS

PCT International Preliminary Examining Authority; International Preliminary Report on Patentability (Chapter II) regarding PCT/US2021/030166, dated May 17, 2022, including Applicant's Formal Reply to Written Opinion and Article 34 Amendment, 22 pages.
European Patent Office, Extended European Search Report regarding European Patent Application No. 21797022.7, Dated Apr. 15, 2024.

* cited by examiner

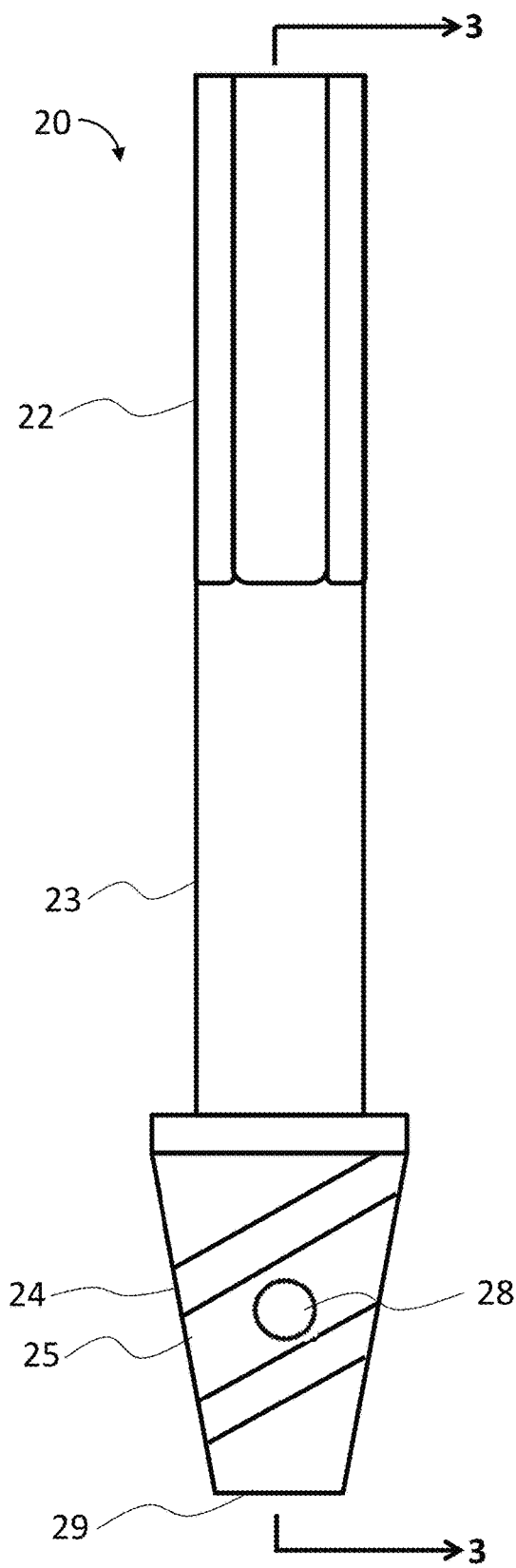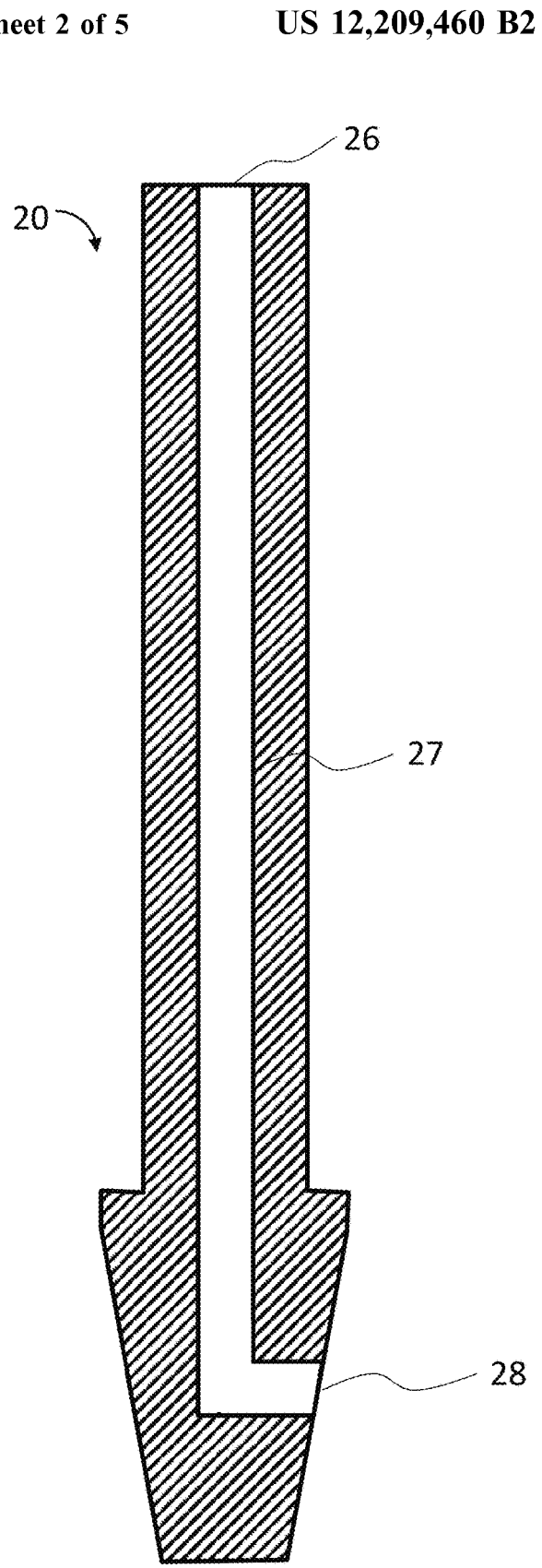
FIG. 2
FIG. 3

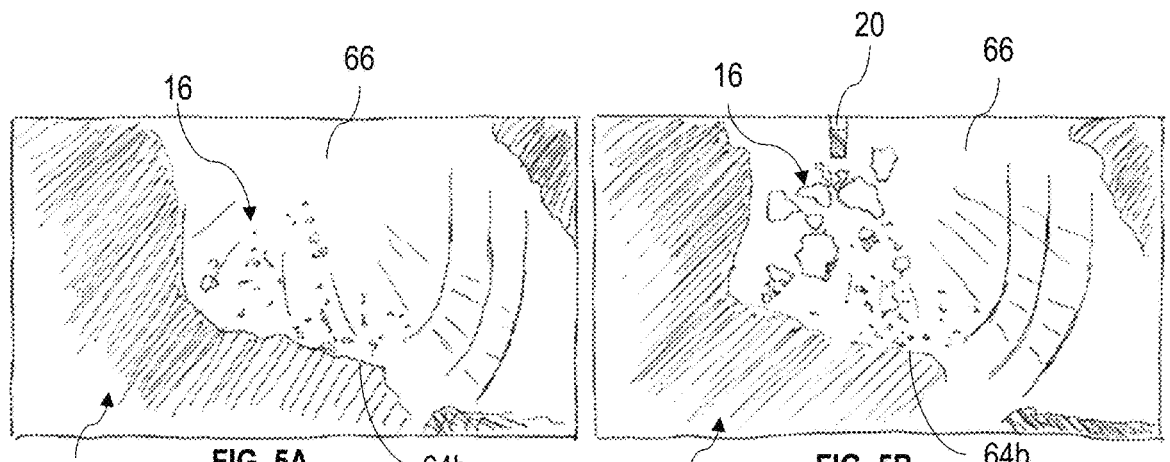
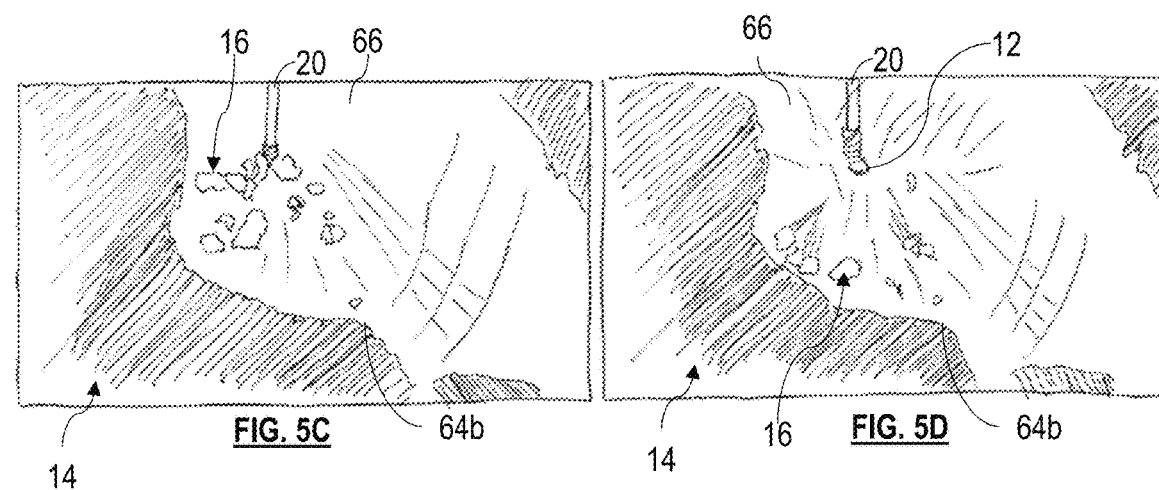
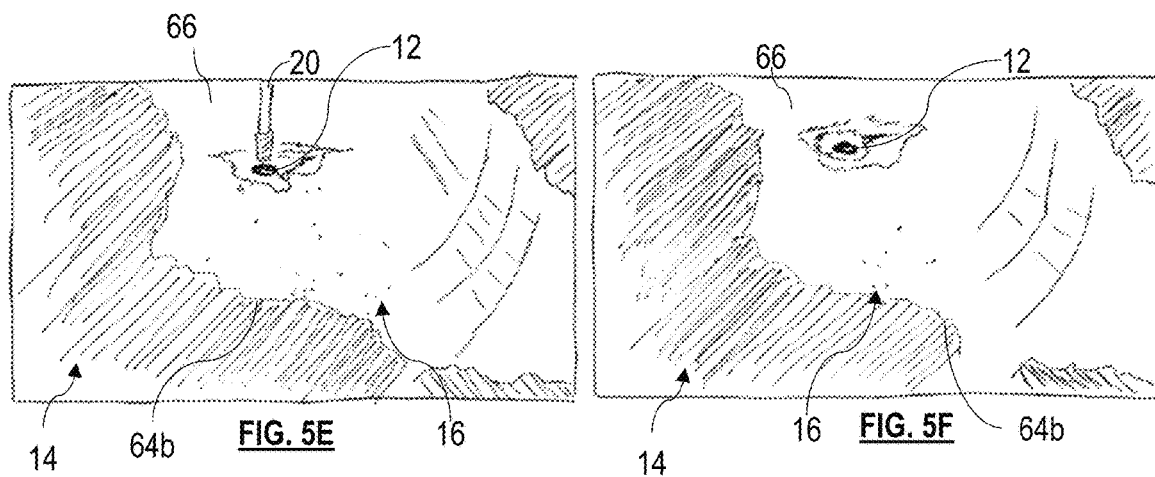

WEEP-HOLE DRILLING

CROSS-REFERENCE TO RELATED APPLICATIONS

The present patent application claims priority to and is a continuation of the non-provisional application identified by U.S. Ser. No. 18/165,055, filed Feb. 6, 2023, which is a continuation of the non-provisional application identified by U.S. Ser. No. 17/245,702, filed Apr. 30, 2021, which issued as U.S. Pat. No. 11,572,741 on Feb. 7, 2023, which claims priority to the provisional patent application identified by U.S. Ser. No. 63/018,085, filed on Apr. 30, 2020, the entire content of each of which is hereby incorporated herein by reference.

FIELD OF THE INVENTION

The present disclosure relates generally to creating a weep hole in a fully or partially cured concrete structural component such that material removed from the concrete structural component due to forming the weep hole does not interfere with functionality of the weep hole.

BACKGROUND OF THE INVENTION

A hollow core floor is a precast slab of concrete constructed with multiple, continuous, interior voids that run the length of the slab. These voids allow the slab to maintain its structural strength while significantly reducing its weight and material requirement. A serious concern associated with hollow core flooring is the potential for water entering and collecting inside these voids. If a significant volume of water is able to collect in a void, then the increased weight can cause additional stresses on the structural members of a building. Additionally, if a void that contains water experiences freezing temperatures, then the thermal expansion of the freezing water could cause the slabs to crack and weaken. Even if only a small amount of moisture is able to accumulate due to improper ventilation, many health problems and damage to building components can occur as a result of the growth of mold and bacteria. It is therefore extremely important to permit the escape of water from the interior voids of hollow core floor members in order to prevent severe and permanent damage to a structure.

In order to avoid these types of problems weep holes are created on the bottom-side of each void to allow water to drain from the void. The conventional method for creating weep-holes in a concrete structure is to drill a hole using a drill and a masonry drill bit. The drilling location should be positioned in-line with the center of the void while the concrete is either fully or partially cured. It is desirable to drill the weep hole while the concrete is only partially cured, because the concrete will be softer, thus requiring less physical labor and extending the tool life of the drill bit. When creating the weep hole, a head of a masonry drill bit is positioned in the desired location for the hole. Power is then applied to a drill which has the masonry drill bit attached. The head of the masonry drill bit cuts the concrete material, and the flutes of the bit lift the cut material (i.e., concrete debris) from the hole and deposit the cut material adjacent to the drilling area. Once the drill bit has passed through the concrete material and has entered into the core area, the bit is removed, and the weep hole is complete. A major problem associated with the aforementioned method for creating weep holes is that the removed concrete debris is only displaced directly adjacent to the drilling surface and oftentimes falls back into the newly drilled hole once the bit is removed. This debris fills or forms a barrier surrounding the newly drilled hole causing the weep hole to be effectively blocked and ineffective. When the weep hole is drilled from within the void while the concrete is only partially cured, the partially cured debris may fall into the newly drilled hole before fully curing. If the partially cured debris is not promptly removed, then the material may become fully cured in the previously drilled weep hole, requiring additional weep hole drilling to remove the material. The conventional methods do not offer a satisfactory solution for creating a weep hole free from debris.

Thus, a need exists for a device and method for creating a weep hole in a concrete structural component, while ensuring that the debris resulting from the creation of the weep hole is removed from the immediate area of the newly created weep hole.

BRIEF DESCRIPTION OF THE SEVERAL VIEWS OF THE DRAWINGS

Like reference numerals in the figures represent and refer to the same or similar elements of functions. Implementations of the disclosure may be better understood when consideration is given to the following detailed description thereof. Such description makes reference to the annexed pictorial illustrations, schematics, graphs, drawings and appendices. In the drawings:

FIG. 2 is a side elevational view of an exemplary drill bit utilized in accordance with the present disclosure.

FIG. 3 is a cross-sectional view of the drill bit of FIG. 1, taken along the lines 3-3.

FIGS. 5A-5F are exemplary diagrammatic perspective views from within a void of the hollow core structural component showing steps for forming a weep hole substantially free of debris, in accordance with the present disclosure.

DETAILED DESCRIPTION OF EXEMPLARY EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
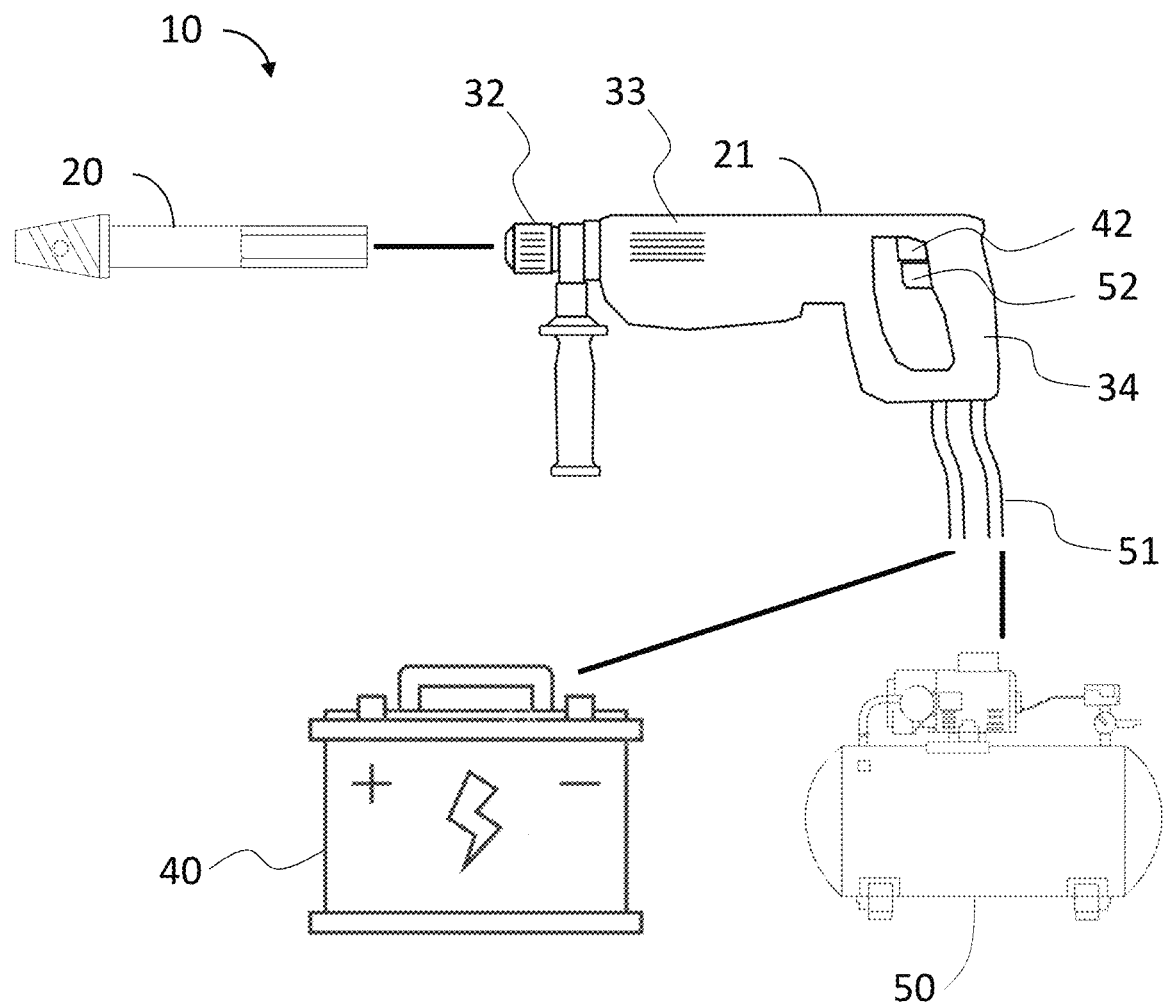
FIG. 1 is a diagrammatic view of an exemplary drilling apparatus constructed in accordance with the present disclosure.

Referring now to the drawings, FIG. 1 illustrates a drilling apparatus 10 for creating a weep hole 12 (see FIG. 4D) in a hollow core structural component 14. The drilling apparatus 10 may be used for drilling the weep hole 12 and removing any material debris 16 generated during a drilling process as depicted in FIGS. 4A-4D, FIGS. 5A-5D, and FIGS. 6A-6F. Broadly, the drilling apparatus 10 may include a drill bit 20, connected to a drill 21.

Referring to FIG. 1-3, the drill bit 20 may have a shank 22, a neck 23, and a body 24. The shank 22 is shown to have a hex shank, but it should be understood that the shank 22 may be a brace shank, a straight shank, a square shank, a SDS shank, a threaded shank or any other type of shank that would securely attach the drill bit 20 to the drill 21. The neck 23 of the drill bit 20 may have a substantially cylindrical shape, although the shape of the neck 23 can vary. In one embodiment, the neck 23 has a diameter equal to or less than a diameter of the body 24. The length of the neck 23 may vary and be dependent upon the dimension of the hollow core structural component 60.

The body 24 may include a cutting edge 29 configured to cut and remove material from the hollow core structural component 60, and flutes 25 that lift the material debris 16 out of the weep hole 12. The length and diameter of the body 24 will vary and will be determined by the depth and diameter requirements for the weep hole 12. The drill bit 20 also includes an internal fluid passageway 27 so that pressurized fluid can enter a fluid inlet 26, travel through the internal fluid passageway 27, and exit a fluid outlet 28. The fluid can be a gas or liquid. For example, the fluid can be air. The fluid inlet 26 will be located in a position at or near the shank 22 so that when the shank 22 is firmly seating in a chuck 32 of the drill 21 the fluid inlet 26 will be fluidly connected to a fluid outlet within the drill 21. The internal fluid passageway 27 may be a generally cylindrical void that extends from the fluid inlet 26 to the fluid outlet 28. The diameter of the internal fluid passageway 27 will be determined based on ensuring that an adequate volume of pressurized fluid is able to flow through the internal fluid passageway 27 at a specified fluid pressure without jeopardizing the structural integrity of the drill bit 20. The fluid outlet 28 may be located at any location along an external surface of the body 24 or the neck 23 of the drill bit 20 so long as the fluid outlet 28 can direct fluid around the weep hole 12 to remove the material debris 16 as described herein. It may, however, be preferable to position the fluid outlet within the body 24 so as to be closer to the cutting edge 29 to greater control the removal of the material debris 16 when releasing pressurized fluid. The size and shape of the fluid outlet 28 may be designed to direct pressurized fluid exiting the fluid outlet 28 in order to maximize the removal of material debris 16 located near the weep hole 12.

The drill 21 includes the chuck 32 that is configured to connect to the drill bit 20, and a motor (not shown) included within a housing 33. In the example shown, the drill 21 is powered by electricity, although other forms of powering the drill 21 can be used. For example, the drill 21 can be a pneumatic drill powered by pressurized fluid. In some embodiments, the drill 21 is portable and adapted to be utilized by an operator to manually form the weep hole 12. In this embodiment, the drill 21 includes a handle 34 that can be gripped by the operator. In other embodiments, the drill 21 is connected to a guide and operated as part of a larger machine to form the weep hole 12. In some embodiments, the drilling apparatus 10 may include multiple drills 21 connected to multiple bits 20 that are guided simultaneously (or separately) to form multiple weep holes 12. In some embodiments, the drill 21 is a hammer drill, while in other embodiments, the drill 21 is not a hammer drill.

In the example shown, the drill 21 is connected to a power source 40 that provides the energy to enable the drill 21 to rotate the drill bit 20. The power source 40 may provide power in the form of electric, hydraulic, or pneumatic power. The drilling apparatus 10 includes a power switch 42 that controls the flow of power from the power source 40 to the drill 21. Although FIG. 1, depicts the power switch 42 as a trigger switch located near the handle 34, it should be understood by a person skilled in the art that the power switch 42 does not need to be fixed to the drill 21. The power switch 42 may be operated manually in the form of a push button switch, a toggle switch, a rotary cam switch, a valve, or any other similar device. Alternatively, the power switch may be operated autonomously by way of computer software instruction. When the power switch 42 is switched on, power from the power source 40 is transmitted to the drill 21, causing the drill 21 to rotate the chuck 32 and the drill bit 20 in a desired direction. The power switch 42 may allow regulation of the power being supplied to the drill 21 from the power source 40 to provide control of a rotational speed and a torque for the drill 21. Alternatively, the rotational speed and torque of the drill may be controlled by other mechanisms.

The drill 21 is also connected to a pressurized fluid source 50 that provides pressurized fluid to the fluid outlet 28 of the drill bit 20 via the drill 21. The pressurized fluid source 50 may be a pressurized fluid tank or a fluid compressor. The pressurized fluid source 50 may include a pressure regulator capable of providing adjustability of the pressure contained within or released from the pressurized fluid source 50. The pressurized fluid source 50 may be connected to the drill 21 via a hose 51. The drilling apparatus 10 also includes a pressurized fluid actuator 52 that may allow pressurized fluid to flow from the pressurized fluid source 50, to the fluid inlet 26, through the internal fluid passageway 27, and exit the fluid outlet 28. The pressurized fluid actuator 52 may be actuated by electric, hydraulic, pneumatic, or human power. For example, the pressurized fluid actuator may be implemented as a valve that is controlled via a trigger that is placed adjacent to the handle 34, as shown in FIG. 1. When the pressurized fluid actuator 52 is actuated, pressurized fluid from the pressurized fluid source 50 is released into the air inlet 26. The drill 21 may have a regulator (not shown) at some location between the pressurized fluid source 50 and the fluid inlet 26 to allow for the control of the fluid pressure that exits the fluid outlet 28.

Figure 4A:
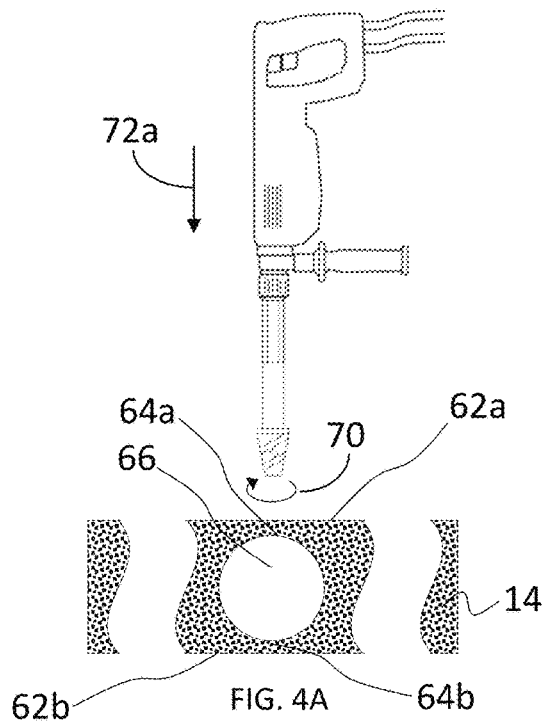
FIGS. 4A-4D are diagrammatic, side elevation views of the drilling apparatus being utilized to form a weep hole in a hollow core structural component in accordance with the present disclosure.

Turning now to FIGS. 4A-4D, an exemplary method of use of the drilling apparatus 10 will be described. As shown in FIG. 4A, first the drilling apparatus 10 may be positioned so that the drill bit 20 is situated in a direction for drilling with the body 24 of the drill bit 20 at a location for drilling the weep hole 12 in a hollow core structural component 14. The hollow core structural component 14 may have one or more external surfaces 62 and one or more internal surfaces 64 forming a cavity 66 in the hollow core structural component 14. In one embodiment, as shown in FIGS. 4A-4D, the hollow core structural component 14 may have a first one or more external surface 62a and a second one or more external surface 62b. However, it will be understood that the hollow core structural component 60 may have more or fewer external surfaces 62.

The operator may engage the power switch 42 to provide power to the drill 21 from the power source 40 so that the drill 21 rotates the drill bit 20 in a desired rotational direction 70 and at a rotational speed for drilling the weep hole 12 through the hollow core structural component 14. A first directional force 72a may be applied to the drill 21 in a desired direction for drilling the weep hole 12.

Figure 4B:
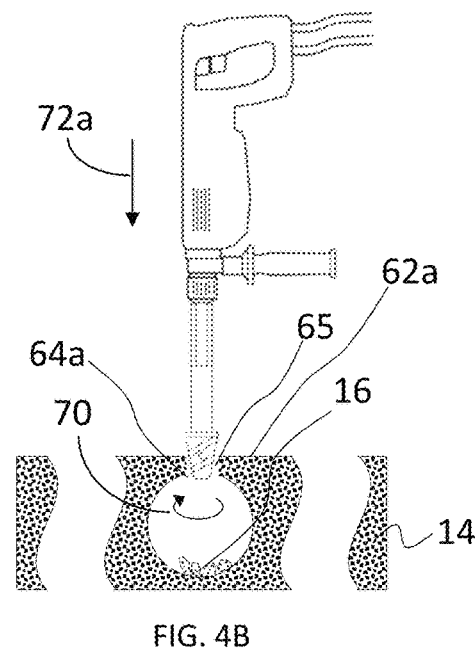

As illustrated in FIG. 4B, the first directional force 72a may be applied to drive the drill bit 20 to drill from a first one or more external surface 62a, through the material of the hollow core structural component 14, through a first one or more internal surface 64a, and into the cavity 66. The drilling process may cause material debris 16 from a first drilled hole 65 to be deposited just below the first drilled hole 65 and in a general location of where the weep hole 12 is to be created.

Figure 4C:
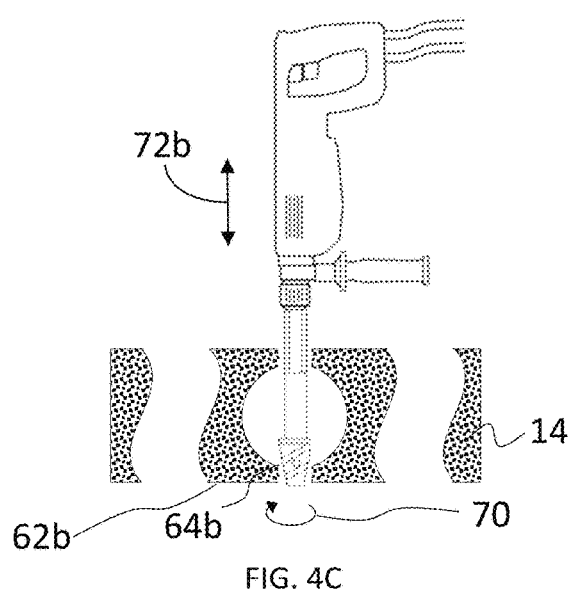

As depicted in FIG. 4C, the first directional force 72a may be applied to drive the drill 21 through the cavity 66, and allow the drill bit 20 to drill through a second one or more internal surface 64b, through the material of the hollow core structural component 14, and through a second one or more external surface 62b. After the drill bit 20 drills through the second one or more external surface 62b, the fluid outlet 28 may be positioned so that the fluid outlet 28 is proximate to the second one or more internal surface 64b. The pressurized fluid actuator 52 may be actuated, causing pressurized fluid to flow from the pressurized fluid source 50, through the hose 51, the internal fluid passageway 27, and exit the fluid outlet 28 while the drill bit 20 continues to rotate in the desired rotational direction 70. The pressurized fluid actuator 52 may allow the pressurized fluid to continue to flow through the drill bit 20, and the drill 21 of the drilling apparatus 10 and out the fluid outlet 28 until all loose, uncured concrete, material debris 16 is substantially removed from the immediate area surrounding the weep hole 12. The pressurized fluid actuator 52 should allow pressurized fluid flow while the drill bit 20 continues to rotate one or more revolutions to ensure the pressurized fluid is directed at the material debris 16 about a parameter of the weep hole 12. A second directional force 72b may be applied to the drill 21 so that the fluid outlet 28 is moved in and out of the weep hole 12. The second directional force 72b may add a third dimension to the position of the fluid outlet 28 which may assist with the removal of material debris 16 proximate to the weep hole 68.

Figure 4D:
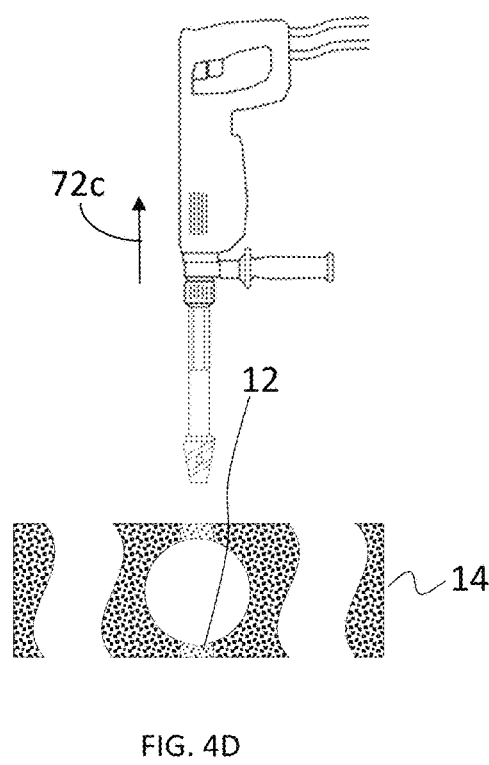

As shown in FIG. 4D, the pressurized fluid actuator 52 may be deactivated, stopping the flow of pressurized fluid through the drilling apparatus 10. The power switch 42 may also be turned off, cutting off the power to the drill 21, and stopping the rotation of the drill bit 20. A third directional force 72c may be applied to the drilling apparatus 10 until the drill bit 20 is entirely removed from the hollow core structural component 14. The result of the process is the creation of the weep hole 12 in the hollow core structural component 14 free of any material debris 16 that might interfere with the function of the weep hole 12. When the hollow core structural component 14 is not fully cured when the weep hole 12 is formed, then the hollow structural component 14 may be allowed to cure prior to installation as a structural component in a structure, such as a building, road, or the like.

FIGS. 5A-5F, illustrates several perspective views from within the cavity 66 of the hollow core structural component 14, showing steps of an exemplary method for forming the weep hole 12 substantially free of material debris 16, in accordance with the present disclosure. FIG. 5A shows the cavity 66 of the hollow core structural component 14 before the method has been initiated toward the creation of the weep hole 68. There may be the presence of loose, material debris 16 within the cavity 66 along the lower portion of the one or more internal surfaces 64 prior to the drilling process as a result of forming the hollow core structural component 14.

As shown in FIG. 5B, a force may be applied to the drill 21 in the direction of the weep hole 12 causing the drill bit 20 to drill through the first one or more external surface 62 and the first one or more internal surface 64. The drill bit 20 continues to rotate inside the cavity 66 after the weep hole 12 has been formed. Additional material debris 16 may collect beneath the first drilled hole 65 as a result of the drilling process.

As depicted in FIG. 5C, the force may continue to be applied to the drill 21 in the direction of the weep hole 12 causing the drill bit 20 to drill through the second one or more internal surface 64 and a second one or more external surface 62. Additional material debris 16 may accumulate around the weep hole 12 as a result of the drilling process.

As shown in FIG. 5D, the drill bit 20 may be positioned so that the fluid outlet 28 is proximate to the second one or more internal surface 64. The pressurized fluid actuator 52 may be actuated, allowing pressurized air to flow through the internal fluid passageway 27 while the drill 21 continues to rotate the drill bit 20. Pressurized fluid exits the fluid outlet 28 with enough force to reposition any loose, material debris 16 a sufficient distance from the weep hole 12. The fluid outlet 28 may be directed generally perpendicular to the drill bit 20 and designed to focus the pressurized fluid exiting the fluid outlet 28 away from the weep hole 12. The drill bit 20 may be rotated one or more revolutions while pressurized fluid is being release from the fluid outlet 28 to ensure all material debris 16 around the weep hole 12 is sufficiently removed from the immediate area. The drill bit 20 may be moved in and out of the weep hole 12 to assist the removal of material debris 16. By moving the drill bit 20 in and out of the weep hole 12, the pressurized fluid exiting the fluid outlet 28 may exert a variety of forces on the material debris 16 that may not be experienced by a stationary drill bit 20.

As shown FIG. 5E, the pressurized fluid actuator 52 may be deactivated so that pressurized fluid is no longer flowing through the drill bit 20 and the drill 21 of the drilling apparatus 10. The power switch 42 may also be turned off, causing the drill 21 to stop rotating the drill bit 20. A force may be applied to the drill 21 opposite of the drilling direction until the drill bit 20 is removed from the hollow core structural component 14.

FIG. 5F, depicts the cavity 66 of the hollow core structural component 14 once the drill bit 20 has been removed. As illustrated in FIG. 5F, the weep hole 12 is free from any loose material debris 16 that might interfere with the function of the weep hole 12.

Figure 6:
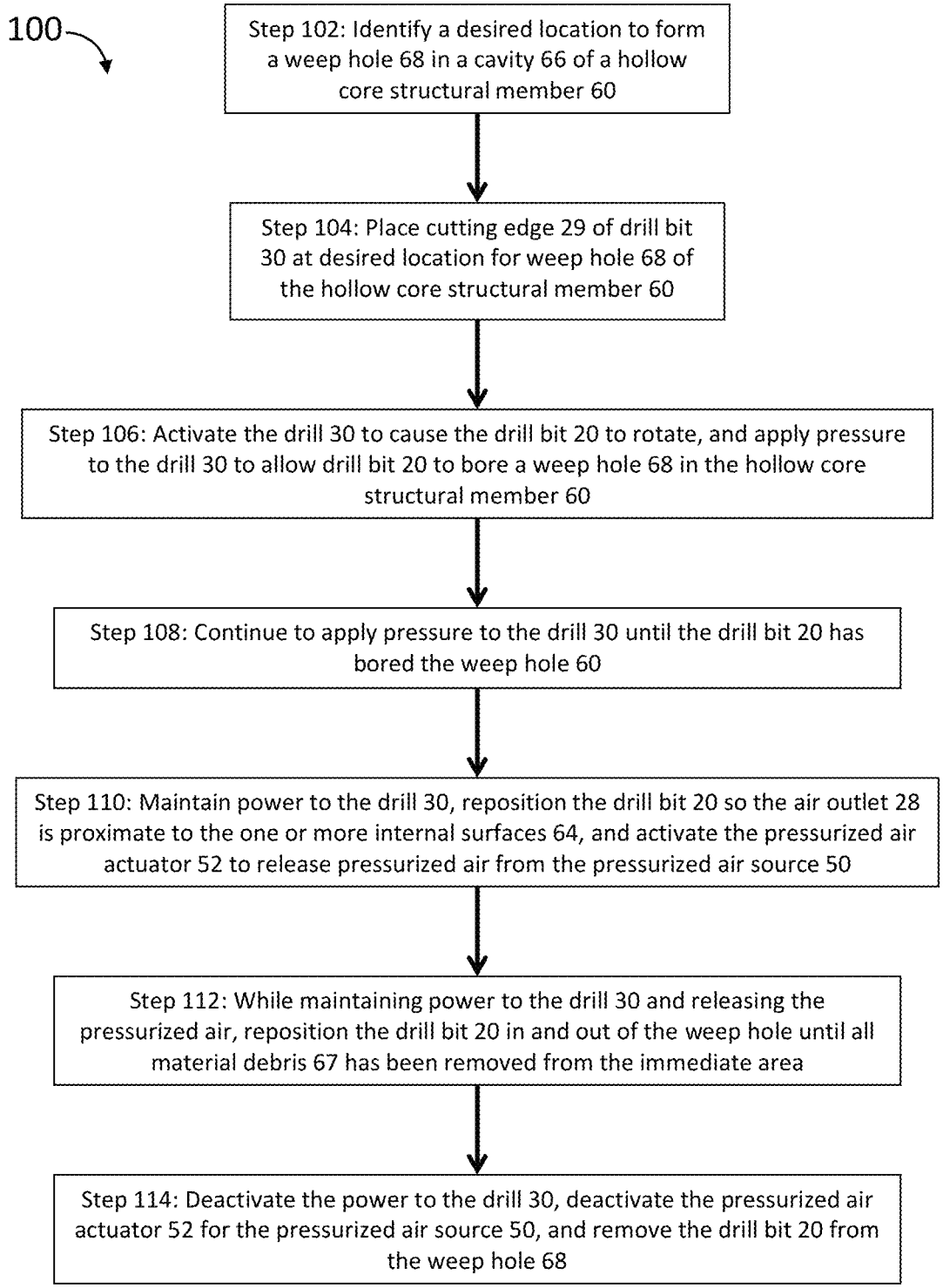
FIG. 6 is a logic flow diagram illustrating an exemplary method for forming a weep hole that is substantially free of debris, within a hollow core structural component in accordance with the present disclosure.

Referring now to FIG. 6, a drilling method 100 provides an exemplary method for forming the weep hole 12 that is substantially free of material debris 16, within the hollow core structural component 14 in accordance with the present disclosure. In step 102 of the drilling method 100, an operator may identify a desired location to form the weep hole 12 in the cavity 66 of the hollow core structural member 14. The ideal location for the weep hole 12 would be the lowest area of the one or more internal surfaces 64, but may be any location within the hollow core structural component 14 that would allow moisture to be removed from the cavity 66. The desired location for the weep hole 12 may only be accessible by first drilling through the opposite side of the hollow core structural component 14.

In step 104 of the drilling method 100, the cutting edge 29 of the drill bit 20 may be placed at the desired location for the weep hole 12. The drill 21 may need to be positioned so that the drill bit 20 will be driven in the desired direction for the weep hole 12. Next, in step 106 of the drilling method 100, the drill 21 may be activated with power to cause the drill bit 20 to rotate, and pressure may be applied to the drill 21 to allow drill bit 20 to bore the weep hole 12 in the hollow core structural member 14. The drill 21 will be activated by turning on the power switch 42 which allows power to be provided to the drill 21 from the power source 40. In step 108, pressure may continue to be applied to the drill 21 until the drill bit 20 has bored the weep hole 12. The amount of pressure required may depend on the characteristics of material of the hollow core structural component 14, the rotational speed of the drill bit 20, and the characteristics of the drill bit 20. Depending on the location of the weep hole 12, the drill bit 20 may need to bore a hole in one or more layers of the hollow core structural component 14 before boring the weep hole 12.

As detailed in Step 110, power may be maintained to the drill 21, while the drill bit 20 may be repositioned so that the fluid outlet 28 is proximate to the one or more internal surfaces 64, and the pressurized fluid actuator 52 is activated to release pressurized fluid form the pressurized fluid source 50. In step 112, power may be maintained to the drill 21 and releasing the pressurized fluid, while the drill bit 20 is repositioned in and out of the weep hole 12 until all material debris 16 has been removed from the immediate area. By performing this action, pressurized fluid will be released in a 360-degree spray about the drill bit 20 and at various points vertically along a drilling axis within the range of the in and out motion. The pressurized fluid will apply forces on the material debris 16 immediately surrounding the weep hole 12. These forces may cause the material debris 16 to be relocated substantially away from the weep hole 12. In one embodiment, the pressurized fluid actuator 52 should be engaged continuously for at least one revolution of the drill bit 20 to ensure pressurized fluid is released in all directions about the drilling axis.

Lastly, in step 114 of the drilling method 100, Once the area immediately around the weep hole 12 has been clear of any loose, material debris 16, power may be shut off to the drill 21, the pressurized fluid actuator 52 may be deactivated to stop pressurized fluid from flowing from the pressurized fluid source 50, and the drill bit 20 may be removed from the weep hole 12.

While the present disclosure has been described in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the presently disclosed methods and compositions. Changes may be made in the structures of the various components described herein, or the methods described herein without departing from the spirit and scope of the present disclosure.

What is claimed is:

1. A system for drilling a weep hole in an uncured, concrete, hollow core structural component having one or more external surfaces and an internal surface, the system comprising:
    a drill;
    a rotatable drill bit connected to the drill and having an internal fluid passageway and a fluid outlet, the rotatable drill bit configured to drill a weep hole in the uncured, concrete, hollow core structural component, whereby loose, uncured concrete material is deposited near the weep hole in an amount and configuration sufficient to interfere with operation of the weep hole; and
    a pressurized fluid source fluidly connected to the internal fluid passageway of the rotatable drill bit, wherein when the drill bit is repositioned so that the fluid outlet is proximate to the internal surface of the uncured, concrete, hollow core structural component, a flow of pressurized fluid is directed from the pressurized fluid source through the internal fluid passageway out of the fluid outlet, thereby removing the loose, uncured concrete material deposited near the weep hole on the internal surface of the uncured, concrete, hollow core structural component.

2. The system of claim 1, wherein the fluid outlet includes at least two fluid outlets, and wherein directing the flow of pressurized fluid comprises directing the pressurized fluid which flows from the pressurized fluid source, through the drill and the rotating drill bit and through the at least two fluid outlets.

3. The system of claim 1, comprising:
    a valve fluidly positioned between the pressurized fluid source and the internal fluid passageway of the rotatable drill bit, the valve having an actuated state in which the pressurized fluid in the pressurized fluid source is directed into the internal fluid passageway of the rotatable drill bit, and the valve having a deactivated state in which a flow of pressurized fluid from the pressurized fluid source is stopped.

4. The system of claim 1, wherein the pressurized fluid source comprises:
a pressure regulator configured to adjust pressure within the pressurized fluid source.

5. The system of claim 1, wherein the pressurized fluid is air.

6. The system of claim 1, wherein the pressurized fluid is a gas.

7. The system of claim 1, wherein the pressurized fluid is a liquid.

8. A system, comprising:
an uncured, concrete, hollow core structural component having one or more external surfaces and an internal surface;
a drill;
a rotatable drill bit connected to the drill and having an internal fluid passageway and a fluid outlet, the rotatable drill bit configured to drill a weep hole in the uncured, concrete, hollow core structural component, whereby loose, uncured concrete material is deposited near the weep hole in an amount and configuration sufficient to interfere with operation of the weep hole; and
a pressurized fluid source fluidly connected to the internal fluid passageway of the rotatable drill bit, wherein when the drill bit is repositioned so that the fluid outlet is proximate to the internal surface of the uncured, concrete, hollow core structural component, a flow of pressurized fluid is directed from the pressurized fluid source through the internal fluid passageway out of the fluid outlet, thereby removing the loose, uncured concrete material deposited near the weep hole on the internal surface of the uncured, concrete, hollow core structural component.

9. The system of claim 8, wherein the pressurized fluid is air.

10. The system of claim 8, wherein the pressurized fluid is a gas.

11. The system of claim 8, wherein the pressurized fluid is a liquid.

12. The system of claim 8, wherein the fluid outlet includes at least two fluid outlets, and wherein directing the flow of pressurized fluid comprises directing the pressurized fluid which flows from the pressurized fluid source, through the drill and the rotating drill bit and through the at least two fluid outlets.

13. The system of claim 8, comprising:
a valve fluidly positioned between the pressurized fluid source and the internal fluid passageway of the rotatable drill bit, the valve having an actuated state in which the pressurized fluid in the pressurized fluid source is directed into the internal fluid passageway of the rotatable drill bit, and the valve having a deactivated state in which a flow of pressurized fluid from the pressurized fluid source is stopped.

14. The system of claim 8, wherein the pressurized fluid source comprises:
a pressure regulator configured to adjust pressure within the pressurized fluid source.

15. A system, comprising:
an uncured, concrete, hollow core structural component having one or more external surfaces and an internal surface;
one or more drills;
two or more rotatable drill bits connected to the one or more drills, each of the two or more rotatable drill bits having an internal fluid passageway and a fluid outlet, each of the rotatable drill bits configured to simultaneously drill a corresponding weep hole in the uncured, concrete, hollow core structural component resulting in two or more weep holes, whereby loose, uncured concrete material is deposited near the two or more weep holes in an amount and configuration sufficient to interfere with operation of the two or more weep holes; and
one or more pressurized fluid source fluidly connected to the internal fluid passageways of the two or more rotatable drill bits, wherein when the two or more rotatable drill bits are repositioned so that the fluid outlets are proximate to the internal surface of the uncured, concrete, hollow core structural component, a flow of pressurized fluid is directed from the pressurized fluid source through the internal fluid passageway out of the fluid outlet of each of the two or more rotatable drill bits, thereby removing the loose, uncured concrete material deposited near the two or more weep holes on the internal surface of the uncured, concrete, hollow core structural component.

16. The system of claim 15, wherein the pressurized fluid is air.

17. The system of claim 15, wherein the pressurized fluid is a gas.

18. The system of claim 15, wherein the pressurized fluid is a liquid.

19. The system of claim 15, comprising:
a valve fluidly positioned between the pressurized fluid source and the internal fluid passageways of the two or more rotatable drill bits, the valve having an actuated state in which the pressurized fluid in the pressurized fluid source is directed into the internal fluid passageways of the two or more rotatable drill bits, and the valve having a deactivated state in which a flow of pressurized fluid from the pressurized fluid source is stopped.

20. The system of claim 15, wherein the pressurized fluid source comprises:
a pressure regulator configured to adjust pressure within the pressurized fluid source.

* * * * *